(12) United States Patent
Arimilli et al.

(10) Patent No.: US 6,792,521 B2
(45) Date of Patent: Sep. 14, 2004

(54) BEHAVIORAL MEMORY MECHANISM FOR A DATA PROCESSING SYSTEM

(75) Inventors: Ravi K. Arimilli, Austin, TX (US); William J. Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 09/978,364

(22) Filed: Oct. 16, 2001

(65) Prior Publication Data

US 2003/0074539 A1 Apr. 17, 2003

(51) Int. Cl.[7] .............................................. G06F 12/02
(52) U.S. Cl. ........................... 711/203; 711/6; 711/202; 711/205; 711/206
(58) Field of Search ............................. 711/6, 202, 203, 711/205, 206

(56) References Cited

U.S. PATENT DOCUMENTS

| | | | |
|---|---|---|---|
| 5,319,760 A | * | 6/1994 | Mason et al. ............... 711/208 |
| 5,404,467 A | | 4/1995 | Saba et al. |
| 5,721,858 A | * | 2/1998 | White et al. ................ 711/203 |
| 5,826,057 A | | 10/1998 | Okamoto et al. |
| 5,860,154 A | | 1/1999 | Abramson et al. |
| 6,119,214 A | * | 9/2000 | Dirks ......................... 711/206 |
| 6,339,752 B1 | | 1/2002 | Mann et al. |
| 6,438,671 B1 | * | 8/2002 | Doing et al. ................ 711/173 |
| 6,442,664 B1 | * | 8/2002 | Maynard et al. ............ 711/203 |

* cited by examiner

*Primary Examiner*—T Nguyen
(74) *Attorney, Agent, or Firm*—Casimer K. Salys; Dillon & Yudell LLP

(57) ABSTRACT

A behavioral memory mechanism for a data processing system is disclosed. The data processing system includes a processor, a real memory, a behavioral address generator, and an address translator. The real memory has multiple real address locations, and each of the real address locations is associated with a corresponding one of many virtual address locations. The virtual address locations are divided into two non-overlapping regions, namely, an architecturally visible virtual memory region and a behavioral virtual memory region. The behavioral address generator generates a behavioral virtual memory address associated with the behavioral virtual memory region. The address translator translates the behavioral virtual memory address to a real address associated with the real memory.

18 Claims, 12 Drawing Sheets

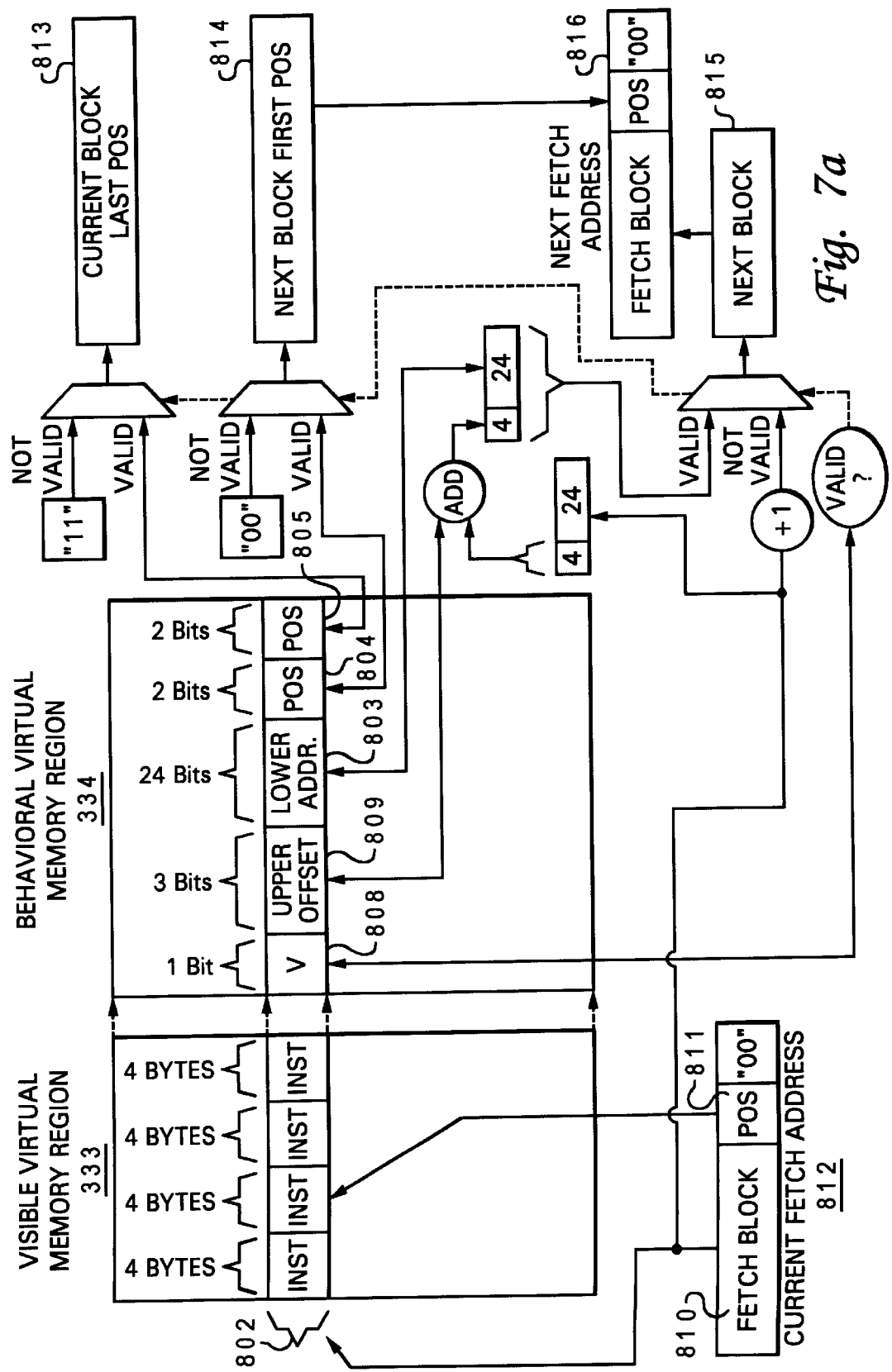

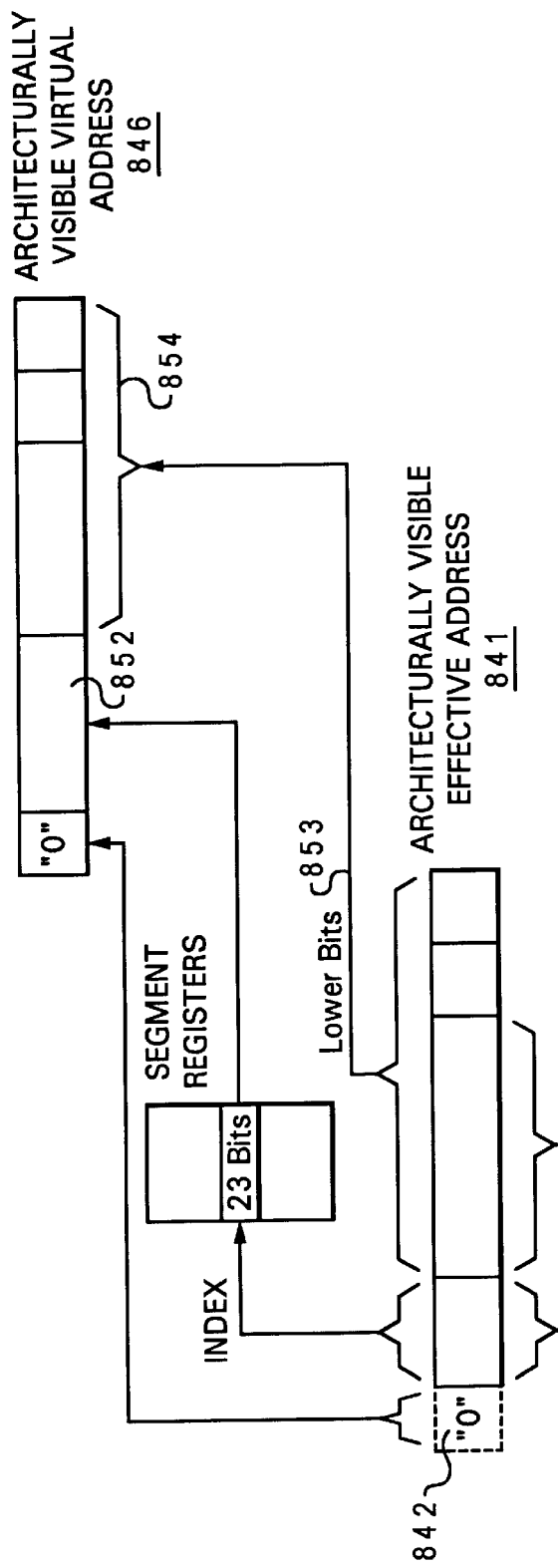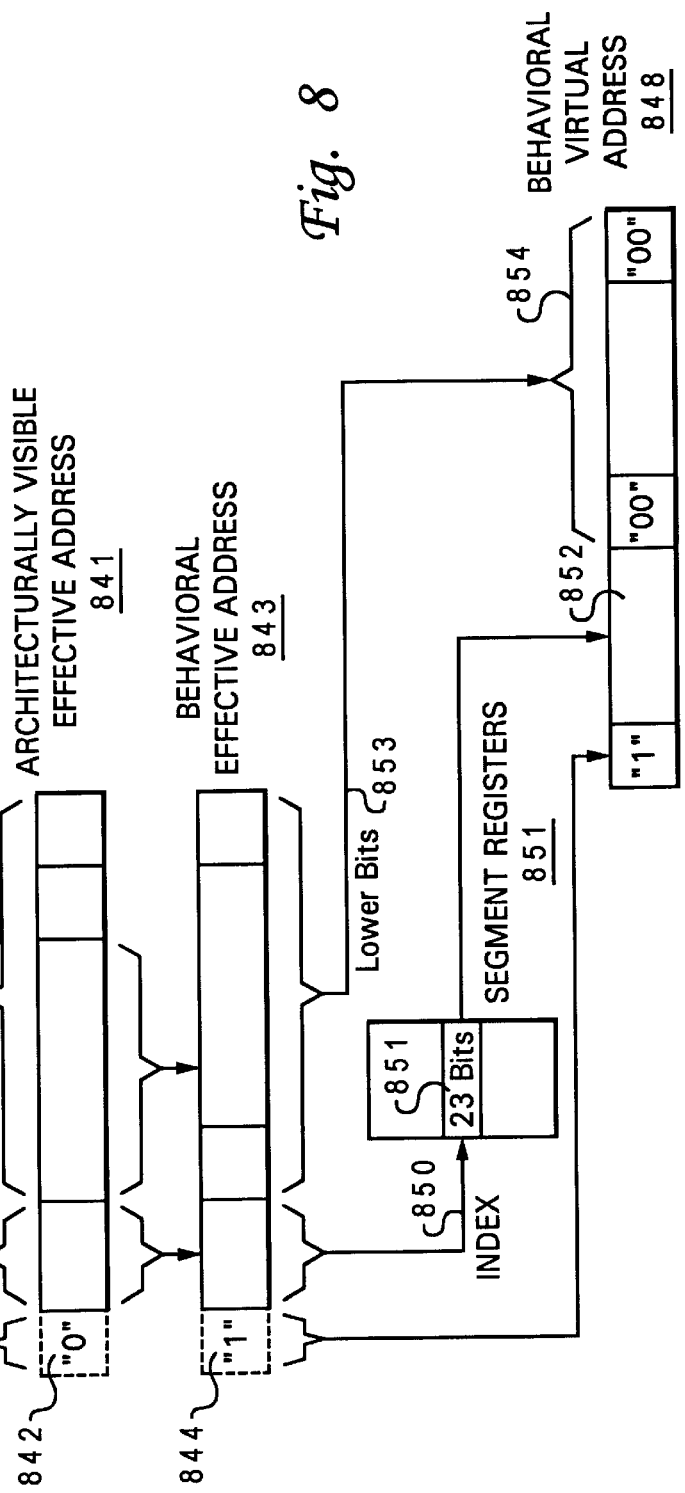
Fig. 8

BEHAVIORAL MEMORY MECHANISM FOR A DATA PROCESSING SYSTEM

RELATED PATENT APPLICATIONS

The present application is related to the following copending U.S. patent applications:

1. U.S. Ser. No. 09/978,354, filed on even date; and
2. U.S. Ser. No. 09/978,356, filed on even date.

All above-mentioned copending applications are assigned to the assignee of the present application, and the content of each is hereby incorporated herein by reference.

BACKGROUND OF THE INVENTION

1. Technical Field

The present invention relates to a data processing system in general, and in particular to a storage architecture within a data processing system. Still more particularly, the present invention relates to a behavioral memory mechanism within a data processing system.

2. Description of the Related Art

Enabled by technological and algorithmic innovation, computer systems have evolved significantly from their humble origins as mechanical tabulating machines. Major enhancements have greatly increased the utility and economic efficiency as well as the computational scope of computing machinery by several orders of magnitude. While much focus is given to technological evolution, also of great significance is the accompanying innovation in architecture. One of the first key architectural enhancements, which gave birth to the modem computer (i.e., the Von Neumann machine), was the enablement of the computer memory from being utilized for maintaining only data values to being utilized for maintaining instructions also. Prior to such, instructions were fed to a processing unit as a stream from an external source. The ability to maintain instructions in the computer memory enables programs to alter their own flow based upon the data values they processed. In addition, economic efficiency can be realized by utilizing the same computer memory for storing both instructions and data.

As demands for each computing resource being able to serve multiple purposes grew, architectures had also evolved to incorporate multiprogramming (or time-sharing) capabilities. In such domains, aspects of the architecture were enhanced to provide management authority to a supervisory program, hiding certain features of the computer from application programs. Maintained by the supervisory program, virtual memory emerged to provide an economical enablement medium for time-sharing. Virtual memory itself was enabled in part by providing a new enhancement that utilized existing real memory, called a page table; and in part by a portion of the supervisory program. The page table acts as a switchboard through which the supervisory program authorizes and connects the virtual memory accesses of application programs to a real memory in which their data values or instructions are actually stored. In addition, underutilized portions of the virtual memory can be swapped to a slower and cheaper medium such as disk storage, while retaining only current or frequently used portions of the virtual memory in the real memory.

Many microarchitectural mechanisms for improving performance rely upon retaining a history of past behavior from which they learn to more accurately predict new behaviors. Examples of mechanisms for storing behavioral history information include data caches, instruction caches, branch prediction mechanisms, fetch prediction mechanisms, etc. By nature, such behavioral history information is microarchitecture specific, and hence, not architecturally visible (i.e., not included in the programmer/machine interface specification). Making behavioral history information architecturally visible would result in undesirable complexity and discontinuity for the architecture. Thus, the tracking of such information still falls on the realm of microarchitecture, and the burden of the management thereof also falls on the microarchitecture. The behavioral history information is typically maintained in tables and buffers constructed of expensive, high-speed logic within a processing unit. As a result, the sizes of those tables and buffers are severely constrained.

The present disclosure provides a behavioral memory mechanism for enhancing microarchitectural performance within a data processing system.

SUMMARY OF THE INVENTION

In accordance with a preferred embodiment of the present invention, a memory system includes a real memory, a behavioral address generator, and an address translator. The real memory has multiple real address locations, and each of the real address locations is associated with a corresponding one of many virtual address locations. The virtual address locations are divided into two non-overlapping regions, namely, an architecturally visible virtual memory region and a behavioral virtual memory region. The behavioral address generator generates a behavioral virtual memory address associated with the behavioral virtual memory region. The address translator translates the behavioral virtual memory address to a real address associated with the real memory.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIGS. 7a–7b are pictorial illustrations of a behavioral memory implementation of a BTAC, in accordance with a preferred embodiment of the present invention;

FIG. 8 is a pictorial illustration of effective-to-virtual address mapping using segment registers, in accordance with a preferred embodiment of the present invention;

DETAILED DESCRIPTION OF A PREFERRED EMBODIMENT

While the term "architecture" is often loosely applied to system structures, in this description, "architecture" represents the boundary between hardware (which exists physically) and software (which exists conceptually). An architecture enabler, such as a mechanism that carries out behaviors and information defined in an architecture, is generally a hardware mechanism. The term "microarchitecture" refers to such a hardware mechanism.

I. Prior Art Address Translations

Generally speaking, at least two levels of address translations are required in a data processing system that utilizes a virtual memory. First, an effective address is translated to a virtual address by, for example, an effective-to-virtual address translator. Subsequently, the virtual address is translated to a real address by, for example, an virtual-to-real address translator.

Figure 1:
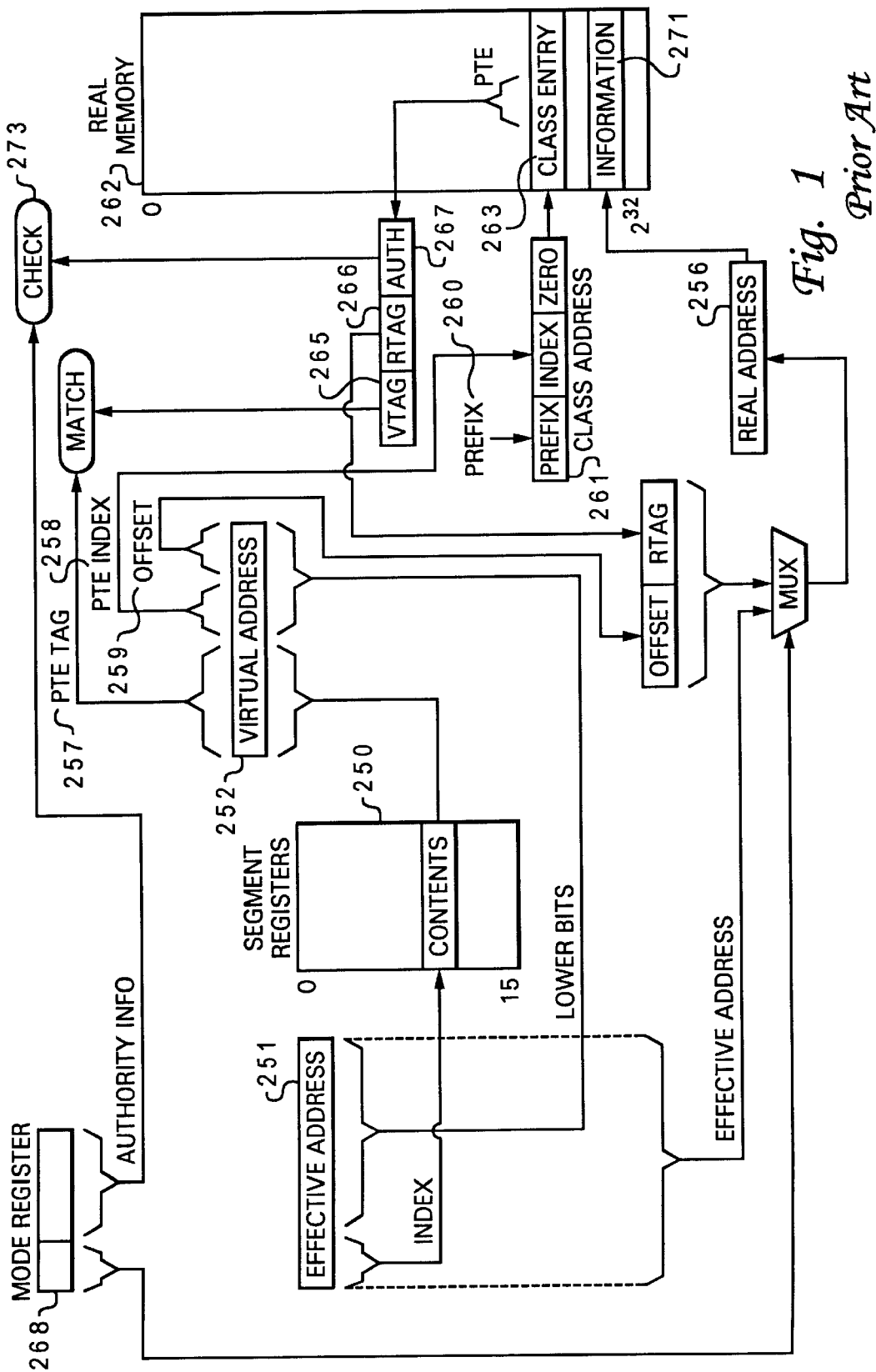
FIG. 1 is a pictorial illustration of address translations, according to prior art.

Referring now to FIG. 1, there is depicted a pictorial illustration of the above-mentioned address translations, according to the prior art. As shown, set of segment registers 250, which can be modified only by a supervisory program, is used implicitly in the translation of an effective address 251 to a virtual address 252 whenever an access to a real memory 262 is made by a currently executing program in virtual address mode. A mode register 268, which is visible only to the supervisory program, may select between a virtual address mode and a real address mode for a data processing system. Mode register 268 also maintains storage access authority information for a currently executing program within the data processing system.

Only the supervisory program may run in the real address mode. In the real address mode, effective address 251 is directly mapped to a real address 256. In the virtual address mode, the most significant four bits of effective address 251 are used to index 1 of the 16 entries within segment registers 250. The contents of segment register 250 are concatenated with the lower 28 bits of effective address 251 to form virtual address 252. Virtual address 252 is then translated into real address 256 in the following manner. Virtual address 252 is subdivided into a page table entry (PTE) tag 257, a PTE class index 258, and an offset field 259. A page table prefix register 260, which is visible only to the supervisory program, is combined with PTE class index 258 and a zero field to form a real PTE class address 261. PTE class address 261 references a class entry 263 in real memory 262. Class entry 263 is made up of eight PTEs. A microarchitectural implementation of this architecture typically uses an effective-to-real address translator (ERAT) or a translation lookaside buffer (TLB) to cache the frequently used PTEs that are in close proximity to a processing unit to avoid the expense of a real storage access for each translation that is performed. The architecture provides to the supervisory program an appropriate set of TLB coherency management instructions.

A PTE contains a virtual tag 265, a real tag 266, and an access authority information field 267. All eight PTEs in class entry 263 are scanned to locate virtual tag 265 that matches PTE tag 257 from virtual address 252. If no match is found, a page fault exception occurs, resulting in the following. The program executing the operation that is attempting the storage access is interrupted. Various program state information, such as virtual address 252 and a program counter (not shown) are saved in a set of state registers visible only to the supervisory program. Mode register 268 is adjusted to place the processing unit in the real address mode. The program counter is set to address 0x00000100, called the page fault exception address. Instruction execution then resumes, beginning at the page fault exception address.

At this point, the supervisory program may establish a virtual to real mapping in the page table and return control to the correct point in the program that incurred the page fault. If a tag match is found, access authority information field 267 is checked at function 273 against the authority information in mode register 268 to determine whether the storage access is legal. If the storage access is not legal, an authority violation exception occurs, resulting in the same steps described earlier for a page fault exception, except that the program counter is set to address 0x00000200, called the authority violation exception address. The supervisory program may take whatever steps deemed necessary for resolving the authority conflict. If a tag match is found, and the storage access is legal, real address 256 is formed by combining real tag 266 with offset field 259 from virtual address 252. Information 271 stored in real memory 262 that is indexed by real address 256 can be manipulated based upon the definition of the operation (e.g., instruction fetch, load, store) accessing information 271.

II. Behavioral Memory Mechanism

In accordance with a preferred embodiment of the present invention, an architecture is extended to support behavioral memory by restricting the range of virtual memory for use by architecturally visual data and instructions and reserving a portion of the existing virtual memory for use by microarchitectural mechanisms. Thus, virtual addresses can be categorized into two groups, namely, architecturally visible virtual addresses and behavioral virtual addresses. A bit extension is added to each virtual address within the architectural layer of a data processing system. For example, an architecturally visible virtual address is signified with a logical "0" in its most significant bit (MSB), and a behavioral virtual address is signified with a logical "1" in its MSB.

Figure 2:
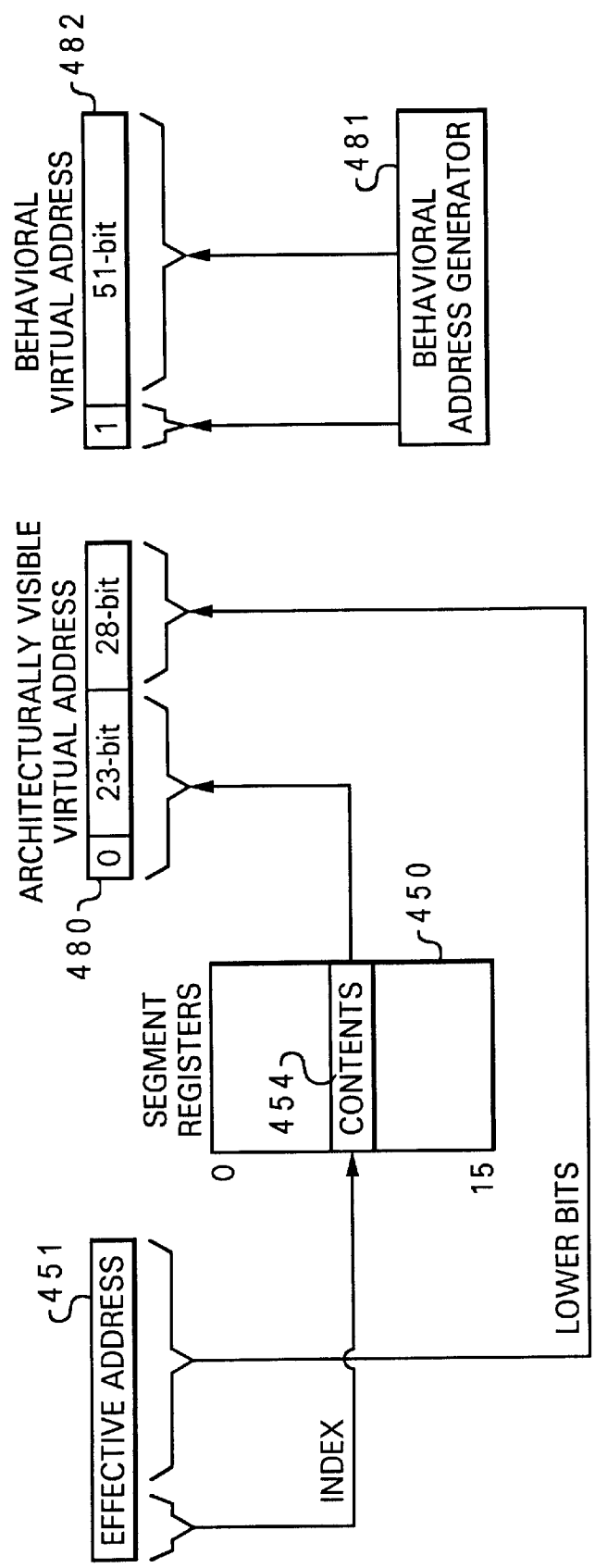
FIG. 2 is a pictorial illustration of a memory architecture extension that enables a behavioral memory mechanism, in accordance with a preferred embodiment of the present invention.

With reference now to FIG. 2, there is depicted a pictorial illustration of a memory architecture extension that enables a behavioral memory mechanism, in accordance with a preferred embodiment of the present invention. Compared to segment registers 250 (from FIG. 1), segment registers 450 are modified to maintain a logical "0" value in the MSB of each segment register. As a result, the range of values contained in each segment register within segment registers 450 are reduced accordingly. For example, if each segment register within segment registers 250 is 24 bits, each segment register within segment registers 450 is 23 bits. Consequently, the underlying microarchitecture may implement a segment register using only 23 bits.

As mentioned previously, only virtual addresses with a logical "0" value in the MSB may be used to maintain architecturally visible instructions and data, while virtual addresses with a logical "1" value in the MSB are reserved as behavioral memory for use by the microarchitecture. In the present embodiment, a virtual address with a logical "0" value in the MSB is an architecturally visible virtual address or visible virtual address, and a virtual address with a logical "1" value in the MSB is a behavioral virtual address. As shown in FIG. 2, a visible virtual address 480 is preferably formed by concatenating 24-bit contents 454 of a segment register within segment registers 450, which is indexed by the four MSBs of effective address 451, with 28 lower order bits from effective address 451. A behavioral virtual address 482 is preferably formed by a behavioral address generator 481 for purposes known to the microarchitecture, but not to the architecture, by concatenating a bit set to a logical "1" value with a 51-bit value generated by a behavioral address generator 481.

To insure the integrity of the newly imposed restrictions, a test can be performed as a step in the address translation process. When a virtual address is formed (or alternatively, when a segment register's value is assigned), its MSB is tested against the type of mechanism which spawned the request. If the request is generated by an architectural operation such as an instruction fetch, load, or store, the MSB should be a logical "0." Otherwise, if the request is generated by a microarchitectural mechanism using behavioral address generator 481, the MSB should be a logical "1." Failure to pass the above-mentioned test results in a new type of exception known as an architectural visibility exception, which will lead to the same steps previously described for a page fault exception, except that the program counter is set to address 0x00000300—an architectural visibility exception address. The supervisory program may take whatever steps deemed necessary for resolving the architectural visibility conflict. Since the exception was caused by the action of a microarchitectural mechanism, rather than that of an architectural instruction, the architecture may define the exception as an imprecise exception; meaning that the instruction step at which the exception must be made visible to the architecture is undefined.

Figure 3:
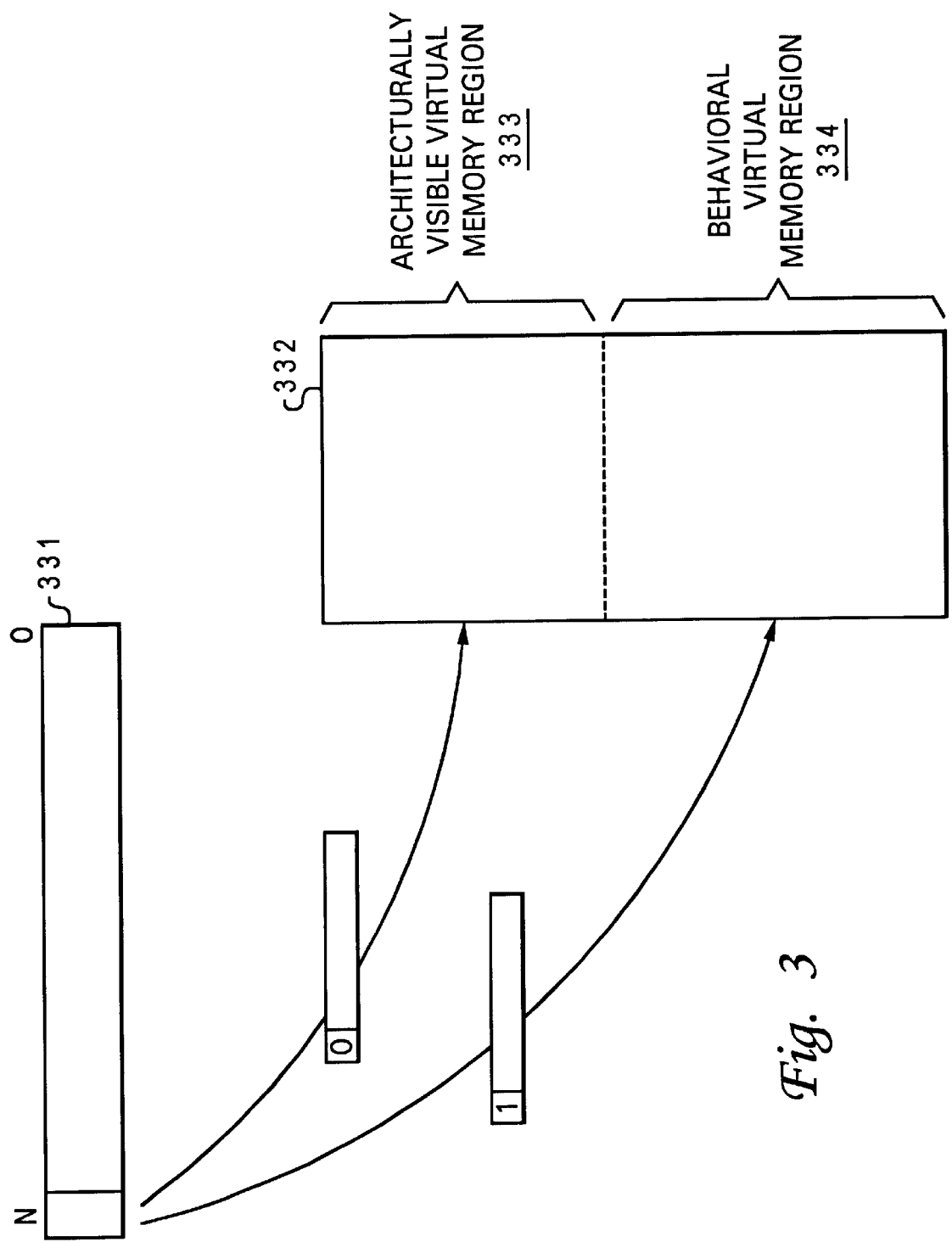
FIG. 3 is a pictorial illustration of accessing a virtual memory, in accordance with a preferred embodiment of the present invention.

Due to the above-mentioned virtual address modification, the corresponding virtual address space can be divided into two non-overlapping regions, namely, an architecturally visible virtual memory region and a behavioral virtual memory region. Referring now to FIG. 3, there is depicted a pictorial illustration of accessing a virtual memory, in accordance with a preferred embodiment of the present invention. As shown, a virtual memory (or virtual address space) 332 is divided into an architecturally visible virtual memory region 333 and a behavioral virtual memory region 334. The MSB N of a virtual address 331 is utilized to indicate whether or not virtual address 331 is directed to architecturally visible virtual memory region 333 or behavioral virtual memory region 334 of virtual address space 332. For example, a logical "0" in the MSB N of virtual address 331 indicates that virtual address 331 is directed to architecturally visible virtual memory region 333 of virtual memory 332, and a logical "1" in the MSB N of virtual address 331 indicates virtual address 331 is directed to behavioral virtual memory region 334 of virtual memory 332. Accordingly, behavioral address generator 481 (from FIG. 2) may only produce those virtual addresses having a logical "1" in the MSB.

Aside from reserving the MSB of a virtual address, it should be noted that the division of a virtual memory into an architecturally visible virtual memory and a behavioral virtual memory may be accomplished in many ways depending upon the constraints of any given embodiment. Other methods, all of which fall within the spirit and scope of the present invention may include, but are not limited to, increasing the size of a virtual address by one or more bits and using the value in those bits to discriminate, or choosing a field of one or more bits, perhaps even indicating the field by extending the architecture via a new specification register, and using the value in those bits to discriminate.

Whatever the combination of address bits used to discriminate between architecturally visible virtual memory and behavioral virtual memory, the behavioral virtual memory is still managed by architecturally appointed controls and assists. For example, when a load instruction results in a page fault exception, the supervisory program manages the allocation of a real page frame as backing storage for the faulting virtual page, including the deallocation of a previously existing virtual to real mapping, the migration of the information from the deallocated real memory frame to a backing storage medium such as a hard disk, the retrieval from the hard disk of the information in the faulting virtual page, the placement of that information into the real page frame, and the establishment of the new mapping in the page table.

Similarly, if a behavioral virtual memory fetch results in a page fault exception, just as with an architecturally visible operation, the supervisory program manages the allocation of a real page frame as backing storage for the faulting virtual page, including the deallocation of a previously existing virtual to real mapping, the migration of the information from the deallocated real memory frame to a backing storage medium such as a disk, the retrieval from disk of the information in the faulting virtual page, the placement of that information into the real page frame, and the establishment of the new mapping in the page table.

Figure 4:
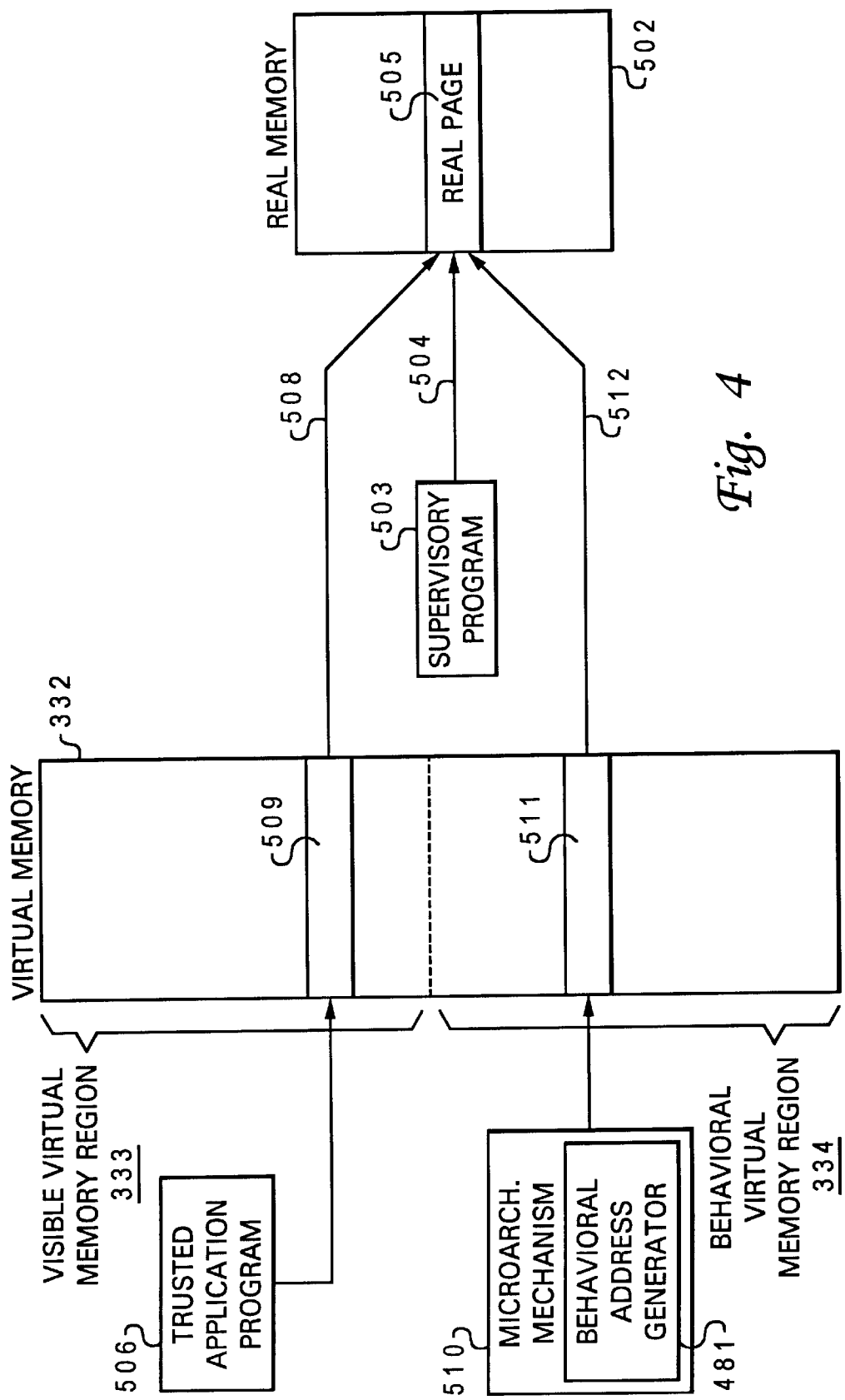
FIG. 4 is a pictorial illustration of virtual-to-real memory mapping, in accordance with a preferred embodiment of the present invention.

With reference now to FIG. 4, there is depicted a pictorial illustration of the mapping of virtual memory 332 to a real memory 502, in accordance with a preferred embodiment of the present invention. During operation, a supervisory program 503 may interact with behavioral virtual memory region 334 via architectural operations such as load and store instructions. The architectural visibility exception described in FIG. 2 is invoked only when a real address is referenced through an illegal virtual address. However, a real address 505 (though it may be mapped to a behavioral virtual address 511) may also be directly accessed by supervisory program 503 executing in real address mode, and hence operated upon by architectural load and store operations.

Though the behavioral contents are architecturally undefined relative to accesses via behavioral virtual address 511, they are architecturally visible under supervisory control directly through a real address. The values found in real address 505 are undefined, in that they are subject to change, imposed by the microarchitecture at any time and in a manner unknown to the architecture; however, they contain at any given instant in time a value that may be queried by the architecture via a load operation. Similarly, they may be modified at any time by an architectural operation such as a store instruction, though that modification may be immediately altered by the microarchitecture in a manner unknown to the architecture.

Due to the unknown nature of behavioral information, and the possible consequences of its corruption, it is important that all architectural manipulation (via links 504 and 508) of such information occur only under the control of supervisory program 503 or its appointed agent such as a trusted application program 506. Supervisory program 503 may delegate architectural access via a virtual address 509 to trusted application program 506 by establishing an architectural virtual-to-real link 508 to real page 505 on behalf of trusted application program 506. Such an arrangement allows supervisory program 503, which may not incorporate, and should not be required to incorporate, knowledge of a microarchitectural mechanism 510 to grant behavioral memory access as architecturally visible virtual memory 509 access to trusted application program 506, which does incorporate knowledge of microarchitectural mechanism 510, for the purpose of allowing trusted application program 506 (using architectural storage operations) to partner with microarchitectural mechanism 510 in order to enhance the efforts of the microarchitecture in its use of behavioral memory.

Of critical importance is the ability of supervisory program 503 to sever microarchitectural mechanism 510's behavioral virtual link 512 to a given real page 505 of real memory while supervisory program 503 or its trusted application program 506 accesses that memory through an architectural real address 504 or virtual link 508, and to sever virtual link 508 for its trusted application program 506 and refrain from using architectural real address 504 itself while microarchitectural mechanism 510 accesses real page 505 through behavioral virtual link 512 (in a PTE) established by supervisory program 503.

In this way, a given region of behavioral memory 511 is, in a sense, behavioral, only while a PTE exists enabling the mapping 512 between microarchitectural mechanism 510 and real page frame 505 as provided to the architecture through a microarchitectural mechanism (e.g., a cache). It is non-behavioral during any time when PTE mapping 512 has been severed by supervisory program 503.

Attempts to access the behavioral memory by a microarchitectural mechanism when there is no PTE mapping the mechanism to a real page frame result in a page fault exception. While this page fault exception serves to architecturally indicate to the supervisory program that a failed attempt to access memory has occurred, requiring the intervention of the supervisory program; there is no requirement in the microarchitecture to checkpoint and at some point to return and retry such an operation.

Since a behavioral memory page fault exception was caused by the action of a microarchitectural mechanism, rather than that of an architectural instruction, the architecture may define the exception as an imprecise exception; meaning that the instruction step at which the exception must be made visible to the architecture is undefined.

III. Prior Art Branch Target Address Cache

In the prior art, a branch target address cache (BTAC) is typically used to predict an instruction fetch address for a block of instructions based upon the instruction fetch address for a previous block of instructions. The block of instructions referred to here indicates the set of one or more instructions that are concurrently fetched from an instruction cache.

In the absence of a branch instruction (i.e., an instruction that alters the sequential control flow of a program), an address of a given block of instructions is typically obtained by incrementing the address of a previously fetched block of instructions. However, when the previously fetched block of instructions contains a branch instruction, and the branch instruction is taken (i.e., a deviation from the sequential control flow), it is useful to have a mechanism, such as a BTAC, for predicting whether or not the branch instruction will be taken, and for predicting the target address of the first instruction residing on the deviant path. In other words, a BTAC is a cache of non-sequential instruction address transitions. A block of instructions referred herein indicates the set of one or more instructions that are concurrently fetched from an instruction cache. If an instruction fetch block is 16 bytes long, and each instruction word is four bytes (or 32 bits) long, for example, then each instruction fetch block contains four instructions.

Figure 5A:
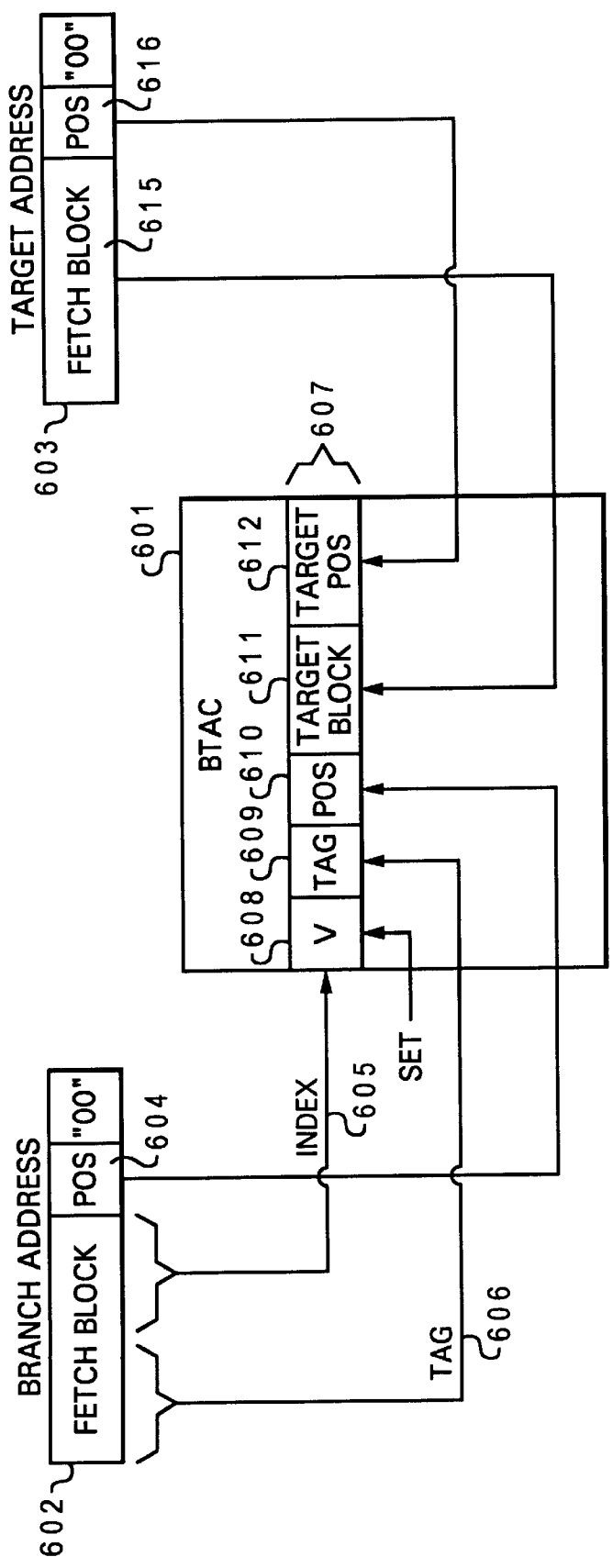
FIGS. 5a–5b are pictorial illustrations of a BTAC, according to the prior art.

Referring now to FIG. 5a, there is depicted a pictorial illustration of a BTAC, according to the prior art. As shown, a BTAC 601 is a direct-mapped cache of non-sequential instruction address transistions that receives effective addresses. Each time a branch is taken, BTAC 601 captures a branch address 602 of a taken branch instruction, as well as a target address 603 of the first instruction residing on the deviant path (the target location of the branch instruction). Branch address 602 can be decomposed into three fields: a position field 604, an index field 605, and a tag field 606. Target address 603 includes a fetch block target address field 615 and a target position field 616.

When a branch is taken, the above-mentioned captured information is used by BTAC 601 to reflect the non-sequential instruction address transition. An index from index field 605 selects a BTAC entry 607 for update. BTAC entry 607 includes a valid indication 608, a tag 609, a branch position 610, a target block address 611, and a target position 612. During an entry update of BTAC 601, valid indication 608 is set; tag 609 is assigned with the value in tag field 606; branch position 610 is assigned with the value in branch position field 604; block target address 611 is assigned with the value in block target address field 615, and target position 612 is assigned with the value in target position field 616.

Figure 5B:
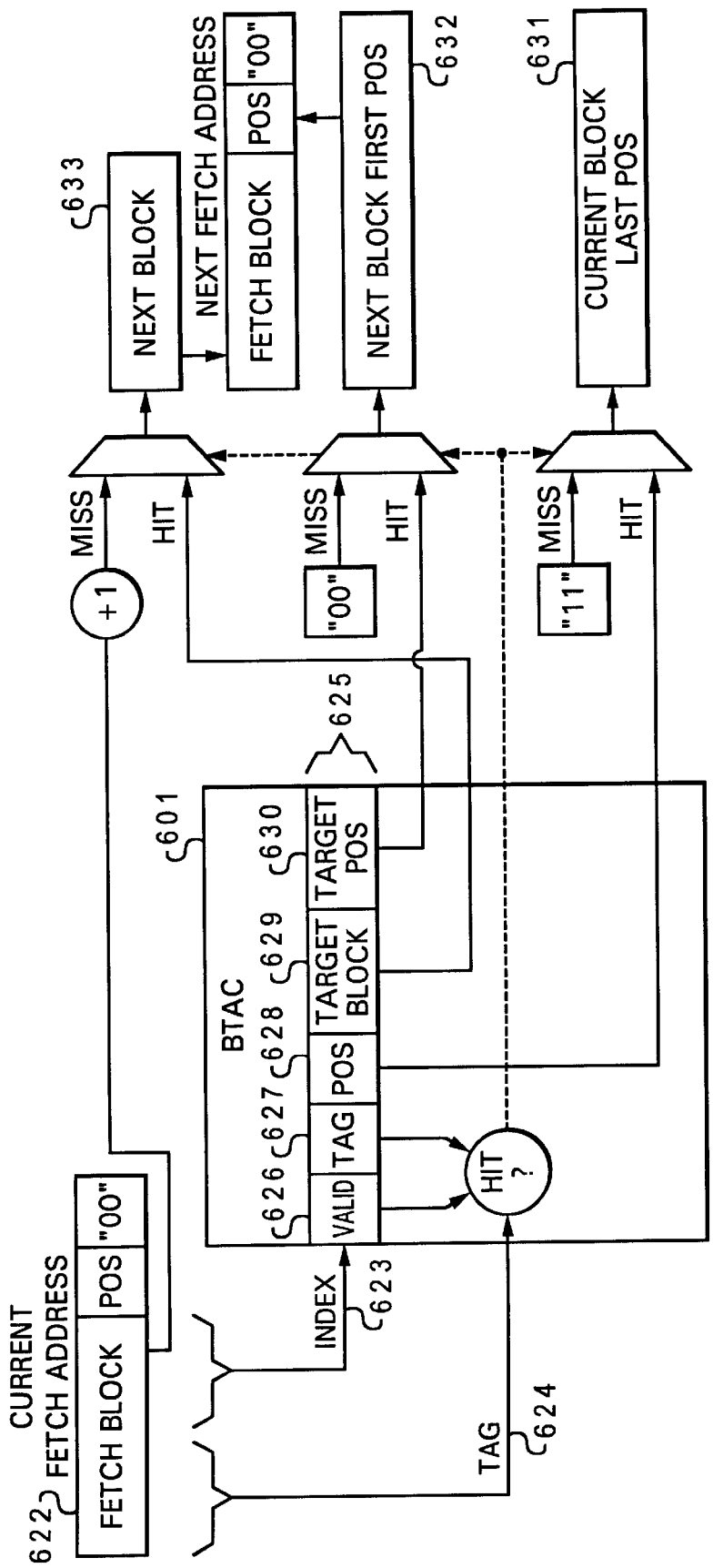

Referring now to FIG. 5b, there is depicted a pictorial illustration of fetch prediction utilizing BTAC 601, according to the prior art. For a current instruction fetch address 634, BTAC 601 is queried to provide a prediction of a next fetched instruction address 635. A current instruction block fetch address 622 can be decomposed into an index field 623 and a tag field 624 (similar to index field 605 and tag field 606, respectively, in FIG. 5a). Index field 623 is used to select a BTAC entry 625 within BTAC 601. BTAC entry 625 (same as BTAC entry 607 in FIG. 5a) includes a valid indication 626, a tag 627, a branch position 628, a block target address 629, and a target position 630. If valid indication 626 is set and tag 627 matches a tag from tag field 624 of current instruction fetch address 634, a BTAC hit has occurred. Otherwise, a BTAC miss has occurred.

In the case of a BTAC miss, a position 631 of the last instruction to execute within the current instruction fetch block is the last position in that block. A position 632 of the first instruction to execute in the next instruction fetch block is the first position in that block. An address 633 of the next instruction fetch block is computed by incrementing the address of current instruction block fetch 622.

In the case of a BTAC hit, position 631 of the last instruction to execute within the current instruction fetch block is read from branch position 628 in BTAC entry 625. The position of the first instruction to execute in the next instruction fetch block is read from target position 630 in BTAC entry 625. Address 633 of the next instruction fetch block is read from block target address 629 in BTAC entry 625. For the case in which a BTAC hit predicts that a branch is taken, but that prediction is incorrect, and the branch is not taken, valid indication 626 in the incorrect BTAC entry 625 may be cleared to prevent the misprediction from recurring.

IV. Prior Art ERAT

In the prior art, an ERAT is often used to expedite the process of translating an effective address to a real address, by caching all recently used effective-to-real address translations. In other words, the intermediate stages of effective-to-virtual address translation and virtual-to-real address translation are bypassed, and only the final real address is stored in an ERAT.

Figure 6:
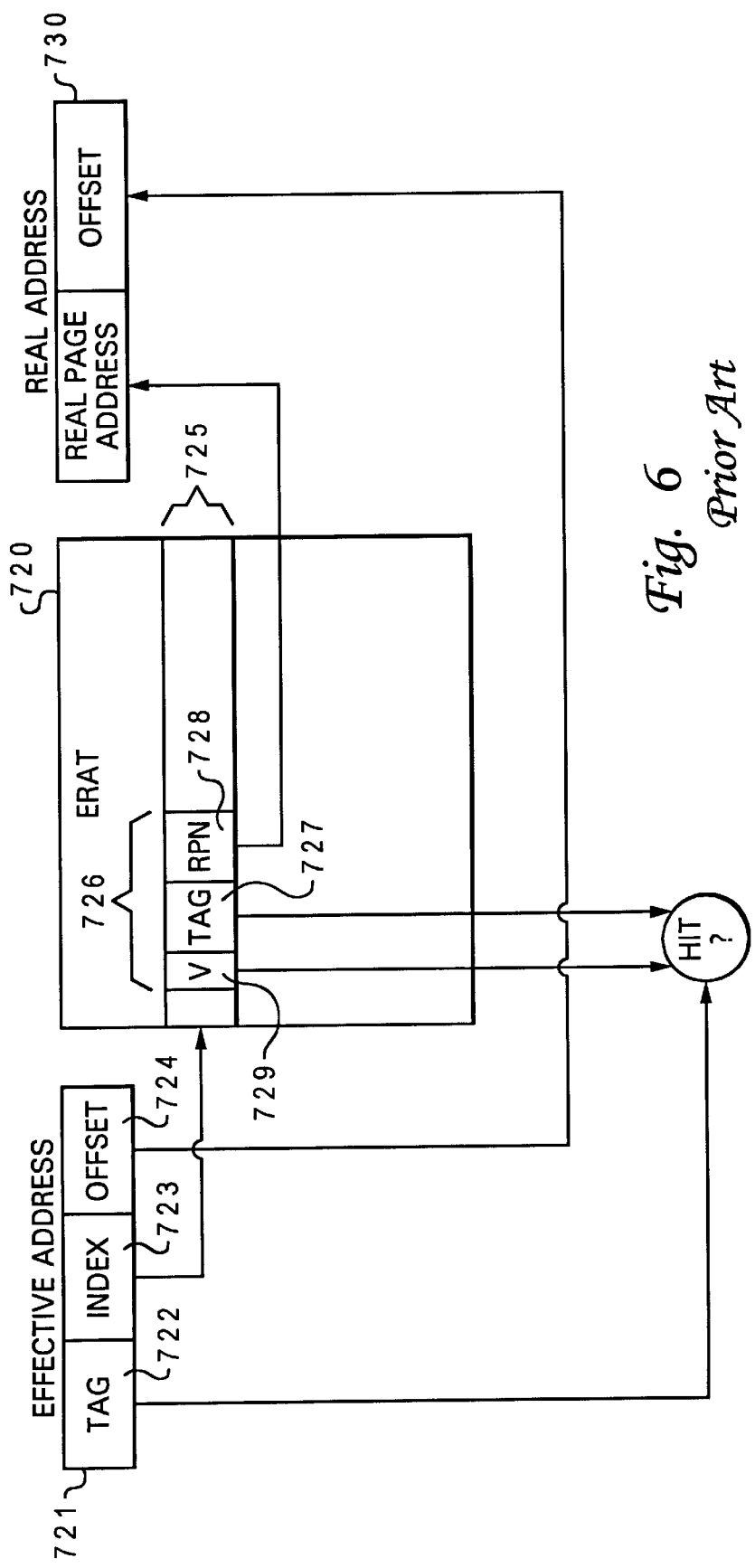
FIG. 6 is a pictorial illustration of a ERAT, according to the prior art.
Figure 76:
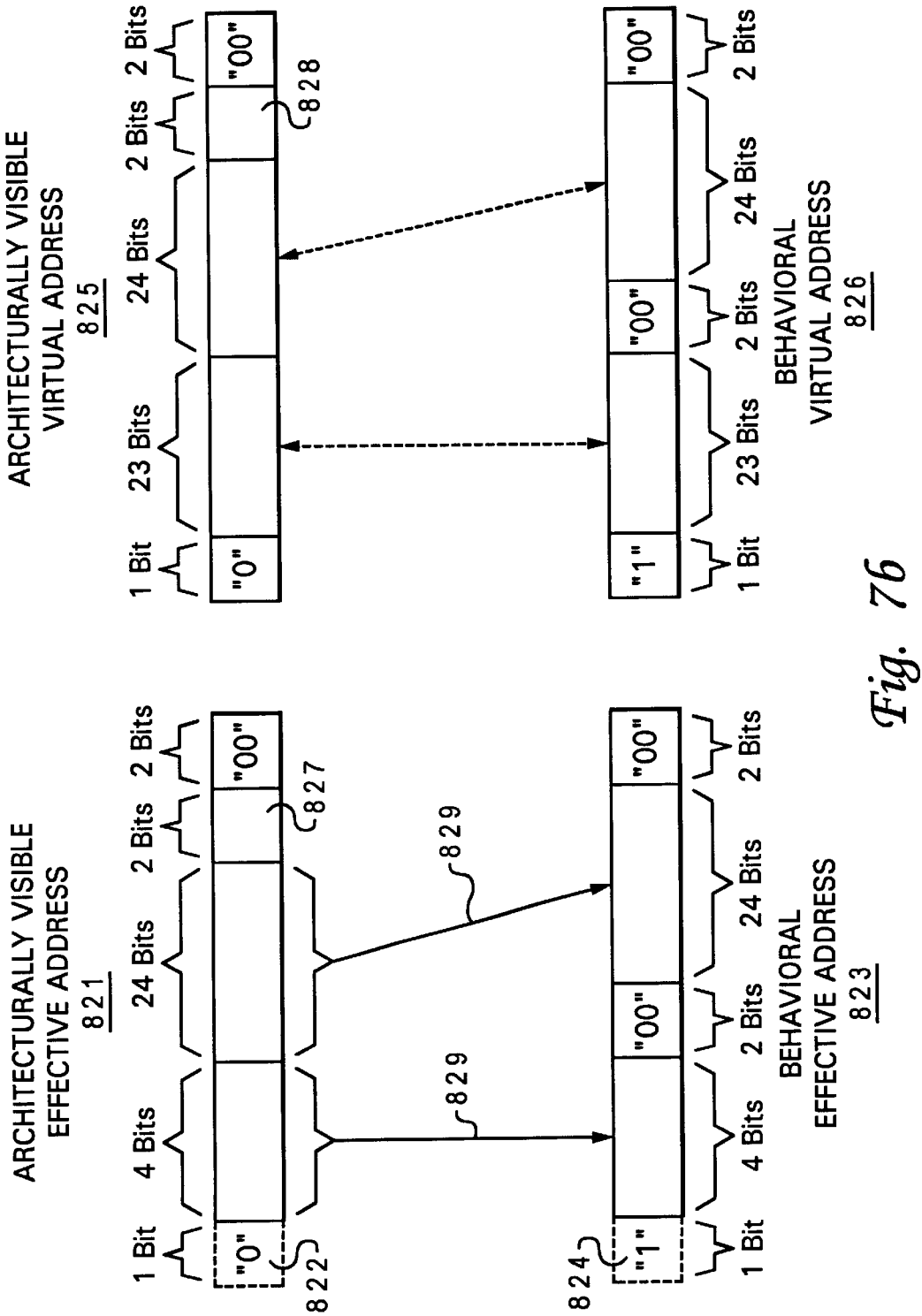

With reference now to FIG. 6, there is depicted a pictorial illustration of an ERAT, according to the prior art. As shown, an ERAT 720 includes multiple rows, and each row includes one or more ERAT entries. For example, an ERAT entry 726 in a row 725 contains a valid indication 729, a tag 727, and a real page address 728.

In order to perform an address translation, an effective address 721 is decomposed into a tag 722, an index 723, and a byte offset 724. For example, after row 725 in ERAT 720 has been selected by index 723, tag 722 is compared with tag 727 found in entry 726 that is marked in valid indication 729. If no match is found, an ERAT miss has occurred and the translation must be accomplished by a less efficient means. If a match is found, an ERAT hit has occurred, and a real address 730 can be formed by concatenating real page address 728 found in the matching entry 726 with byte offset 724 from effective address 721.

V. Behavioral Memory Implementation of Branch Target Address Prediction

A BTAC can be implemented with a behavioral memory. The behavioral memory implementation of a BTAC provides two key improvements on instruction fetch prediction over the prior art BTAC implementation:

1. The dedicated circuitry used to implement a BTAC can be replaced by a lesser amount of circuitry that ties the external microarchitectural interface of the BTAC to existing address translation and cache memory components. Thus, a single medium, a cache memory, will be employed for two purposes: the caching of normal (instruction and/or data) memory, and the caching of a behavioral memory embodiment of the BTAC.
2. The range and scope of a BTAC will be extended such that a unique location will exist in the behavioral memory BTAC for every possible instruction fetch location, allowing a complete history of instruction fetches to be maintained, i.e., a history of the current-to-next instruction fetch location transition for each instruction fetch location in the system. In the prior art BTAC, size limitations typically reduce the coverage to a small subset of the most recent current-to-next instruction fetch transitions. The history of earlier current-to-next instruction fetch transitions, which is displaced from the BTAC, is lost.

Referring now to FIG. 7a, there is depicted a pictorial illustration of a behavioral memory implementation of a BTAC, in accordance with a preferred embodiment of the present invention. Building upon the architectural extension to support behavioral virtual memory described previously, a 4-byte instruction fetch predictor entry, such as instruction fetch predictor entry 801, is allocated from behavioral virtual memory region 334 for every possible 16-byte instruction fetch block location, such as instruction fetch block location 802, in architecturally visible virtual memory region 333. As shown, predictor entry 801 contains a target block upper offset 809 and a target block lower address 803. These values are combined with a current fetch address 812 as described below to produce a target block address (corresponds to field 611 in FIG. 5a). Predictor entry 801 also contains a target instruction position 804 within a target block (corresponds to field 612 in FIG. 5a) and a branch instruction position 805 within the current block (corresponds to field 610 in FIG. 5a). Since there is a unique predictor entry (such as predictor entry 801) for every possible instruction fetch block location (such as instruction fetch block 802), the behavioral memory fetch predictor has no concept of hitting or missing. Every access is a hit. Therefore, no tag is necessary. However, a valid indication 808 is still used to indicate whether or not there is a taken branch. Thus, un-initialized entries (containing all zeroes) have a non-valid indication, and result in not-taken (next sequential) fetch prediction.

Current-to-next instruction fetch block address calculations are performed in terms of effective addresses. An effective address is, for example, 32 bits long, and each fetch block is aligned on a 16-byte boundary, thus, 28 bits would be required to store a target block address, which is formed by combining upper offset 809 and lower address 803 with current fetch address 812. Because there are four possible instruction positions within a block, two bits are required to store target position 804 and two bits are required to store branch position 805. In addition, valid indication 808 requires only one bit. Hence, entire entry 801 requires 28+2+2+1=33 bits, which is too large for a four-byte predictor record. For this reason, what would have been the 28-bit target block address is compressed into a 3-bit target block upper offset 809 and a 24-bit target block lower address 803, which together require 27 bits instead of 28. This brings the size of entry 801 to 3+24+2+2+1=32 bits, which fits into a four-byte predictor record.

In cases when the valid indication is a logical "0," the next sequential fetch block is targeted by setting the current block's last instruction execution position 813 to "11," which denotes the last instruction in the block; by setting the next block's first instruction execution position 814 to "00," which denotes the first instruction in the block; and by setting the next fetch block address to the incremented value from current fetch block address 810, which denotes the next sequential fetch block.

In cases when the valid indication is a logical "1," the branch is predicted by setting the current block's last instruction execution position 813 to branch position 805 indicated in predictor entry 801; by setting the next block's first instruction execution position 814 to target position 804 indicated in the predictor entry 801; and by extracting the four high-order bits from current fetch block address 810, adding them to the signed 3-bit target block upper offset 809 from predictor entry 801, and concatenating the resulting 4-bit value with the 24-bit target block lower address 803 from predictor entry 801.

While this approach reserves an extremely large range of behavioral virtual memory for potential use, the actual cost must be characterized in terms of real memory usage. The behavioral memory instruction fetch predictor increases the real memory working set footprint by 25% of the instruction working set footprint, independent of the data working set footprint. Given that for most applications, instructions comprise only a fraction of the combined instruction/data working set footprint, such increase is only 25% of that fraction. A key benefit derived from this direct addressing relationship between visible virtual memory and behavioral virtual memory is the ease with which the microarchitectural implementation may construct a behavioral address from a visible address. Instead of requiring tables or complex transformations, the microarchitectural implementation only requires a simple rearrangement of existing visible virtual address bits to yield the associated behavioral virtual address bits.

However, there are three factors that may impact the embodiment of the microarchitectural implementation. First, current-to-next instruction fetch block address calculations are performed in terms of effective addresses. Second, microarchitectural incorporation of an ERAT bypasses effective to virtual address translation. Third, behavioral memory, while it may be embodied using effective memory, is preferably embodied using virtual memory. Therefore, for this embodiment of an instruction fetch predictor using behavioral memory, the technique described in FIG. 2, which could be applied if only a visible virtual to behavioral virtual addressing relationship was necessary, must be extended for use with an ERAT to support a microarchitecture-only addressing relationship between architectural visible effective addresses and non-architectural behavioral effective addresses.

Thus, the microarchitectural implementation of the present invention must provide not only a visible virtual to behavioral virtual addressing relationship, but also provides a visible effective to microarchitecture-only behavioral effective addressing relationship, i.e., an ERAT-compatible addressing relationship. In addition, the visible effective to visible virtual mapping must fit within the constraints of effective-to-virtual address translation and the behavioral effective to behavioral virtual mapping must do so as well.

Given that for every four pages of visible instructions, there is one page of behavioral memory, the addressing relationship should avoid populating only one fourth of each behavioral page. Rather it should use one out of four behavioral pages. Also, the relationship should insure that behavioral pages, like visible pages, are uniformly distributed amongst the rows in the ERAT. Finally, if possible, the behavioral effective-to-virtual translation process (for the ERAT-miss case) should make use of the segment register values already put in place for the visible effective-to-virtual translations.

Referring now to FIG. 7b, there is depicted a pictorial illustration of the addressing relationships that satisfy the above-mentioned goals. In order to microarchitecturally incorporate behavioral effective memory, the microarchitecture, not the architecture, prepends a single MSB bit to an effective address. For an architecturally visible effective address (AEA) 821, an MSB bit 822 is forced to preferably a logical "0." For a behavioral effective address (BEA) 823, an MSB bit 824 is forced to preferably a logical "1." In order to map AEA 821 into BEA 823, the microarchitecture rearranges the bits as shown by arrows 829. Bits 827 that indicate the position of an instruction within a fetch block are not used in the formulation of BEA 823.

The relationship between an architecturally visible virtual address (AVA) 825 and a behavioral virtual address (BVA) 826 is also shown in FIG. 7b. Despite the fact that the microarchitecture will generate BVA 826 from BEA 823 (as opposed to generating from AVA 825), the equivalent fields in AVA 825 and BVA 826 are shown with dotted lines for clarity. Similar to bits 827, bits 828 that indicate the position of an instruction within a fetch block are not used in the formulation of BVA 826.

VI. Address Mapping

In the prior art, as mentioned previously, an effective address is typically translated to a virtual address by an effective-to-virtual address translator, and the virtual address is then translated to a real address by a virtual-to-real address translator. In addition, a hardware translation mechanism called an ERAT can also be used to facilitate the translation process from an effective address to a corresponding real address. The ERAT is commonly implemented as a cache of effective-to-real address mappings. Because of the size limitation of the circuitry for implementing the ERAT, only a small set of effective addresses can be translated using the ERAT at any given time. When there is a miss in the ERAT, the entries of the ERAT are updated in much the same way as a cache miss that is well-known in the art.

With reference now to FIG. 8, there is depicted a pictorial illustration of effective-to-virtual address mapping using segment registers, in accordance with a preferred embodiment of the present invention. Such address mapping process is used when there is an ERAT miss. As shown, the address mapping process utilizes the values that already existed within segment registers 851 to map a BEA 843 to a BVA 848 in exactly the same way as an AEA 841 is mapped to an AVA 846 (instead of directly forming a BVA, as shown in FIG. 2). The relationship between an AEA and a BEA that was introduced in FIG. 7b appears again in FIG. 8. For example, as described in FIG. 7b, an effective address is extended by prepending a MSB bit. In FIG. 8, MSB bit 842 of AEA 841 contains a logical "0," and MSB 844 of BEA 843 contains a logical "1." Conforming with the stipulation mentioned in FIG. 2, the MSB of AVA 846 is set to a logical "0," and the MSB of BVA 848 is set to a logical "1." Due to such, as described in FIG. 2, each entry within segment register 851 is effectively reduced from 24 to 23 bits. Conforming to the architecture and the extensions thereof, one of segment registers 851 is selected by an index 850 extracted from either AEA 841 or BEA 843. The contents of the selected segment register are mapped to a segment field 852 of either AVA 846 or BVA 848. Finally, conforming once again to the architecture, lower bits 853 of either AEA 841 or BEA 843 are mapped to the corresponding field 854 of either AVA 846 or BVA 848.

Figure 9:
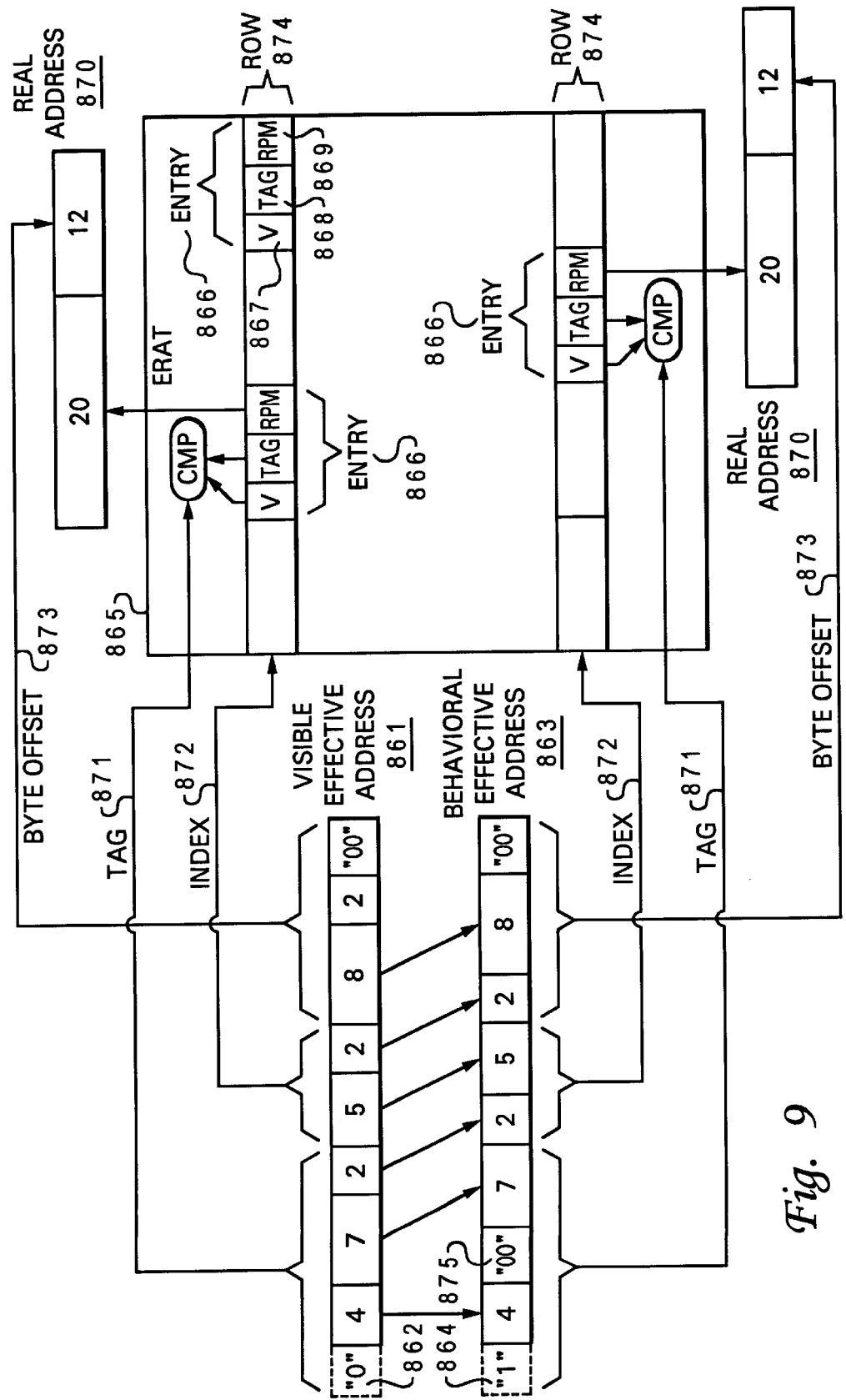
FIG. 9 is a pictorial illustration of effective-to-real address mapping using an ERAT, in accordance with a preferred embodiment of the present invention.

Referring now to FIG. 9, there is depicted a pictorial illustration of effective-to-real address mapping using an ERAT, in accordance with a preferred embodiment of the present invention. The size of the tag fields is extended by one bit to accommodate the additional MSB effective address bit incorporated by the microarchitecture, providing a means to cache effective-to-real translations for both visible and behavioral memory. Note that the relationship between AEAs and BEAs that was introduced in FIG. 7b appears again in FIG. 9, with fragmented bit fields to better illustrate the composition of the tag, index, and byte offset fields. Note also that a shared ERAT is described which is capable of freely mixing visible and behavioral mappings. Those skilled in the art will recognize that a separate ERAT specifically for managing behavioral mappings could be constructed, and that such an ERAT would not require an additional bit in the effective address or in the tag field.

As shown in FIG. 9, an effective address is extended by prepending a MSB bit. It extends the techniques shown in FIG. 6, that is to increase the size of the tag fields by one bit to accommodate the additional MSB effective address bit incorporated by the microarchitecture, and providing a means to cache effective-to-real translations for both visible memory and behavioral memory. In the case of an AEA 861, MSB bit 862 contains a logical "0." In the case of a BEA 863, MSB bit 864 contains a logical "1."

In addition, an ERAT 865 includes multiple rows, and each row is comprised of one or more ERAT entries. ERAT entry 866 includes a valid indication 867, a tag 868, and a real page address 869. To perform either AEA 861 to real address 870 translation or BEA 863 to real address 870 translation, an effective address is decomposed into a tag 871, an index 872, and a byte offset 873. Note that the size of tag 871 has increased by one bit to accommodate the addition MSB effective address bit.

While index 872 is selecting a row 874 in ERAT 865, tag 871 is compared with tag 868 found in each entry 866 that is marked valid 867, residing in row 874. If no match is found, an ERAT miss has occurred and the translation must be accomplished by the means described in FIG. 8. If a match is found, an ERAT hit has occurred, and real address 870 is formed by concatenating real page address 869 found in the matching entry 866 with byte offset 873 from AEA 861 or BEA 863.

Note in particular the "00" field 875 that is introduced into BEA 863 as a result of the factor of four reduction in size between architectural instruction blocks and behavioral instruction fetch predictors. AEA 861 to BEA 863 relationship was chosen such that field 875 would reside in tag field 871, since it produces no disadvantageous effects when placed there. If field 875 was placed in byte offset field 873, then each page frame of real memory allocated for behavioral memory would be at most 25% utilized, resulting in an unnecessary waste of real memory. If field 875 was placed in index field 872, then all behavioral effective-to-real mappings would be restricted to the same 25% of ERAT 865, yielding an uneven distribution and producing hot and cold spots unnecessarily.

For the case in which neither the ERAT-hit process nor the ERAT-miss segment register process yields a translation due to a page fault exception, the microarchitecture (since it is not interruptable like a page faulting load or store instruction, and will instead hang in a wait-for-data state) must be provided with an indication that the requested data will not be returned. Similarly, for the case in which a program is running with address translation disabled (i.e., in real mode), since a BEA as defined in FIG. 7b does not equate to an architecturally legal real address (defined in FIG. 1), behavioral memory will not be provided for a corresponding real memory. So, once again, the microarchitecture, when it generates a behavioral request while the programming is running in real mode must be provided with an indication that the requested data will not be returned.

For such cases, an all-zeroes value is returned to satisfy the microarchitectural behavioral memory fetch request, and that all-zeroes value will result in a not-taken prediction. Thus, the present embodiment of the behavioral memory enabled instruction fetch predictor will always predict branches as not-taken for supervisory programming subroutines that run in real address mode. Any behavioral memory store request that incurs a page fault or that is generated on behalf of a program running in real address mode is discarded. Note that it is possible to alter an architecture in a manner that supports a behavioral memory implementation with real memory as well as with virtual memory, and that such a technique could be used to circumvent the real-addressing-mode situation described above.

As has been described, the present invention provides a behavioral memory mechanism within a data processing system. Specifically, the present invention is implemented by restricting the range of virtual memory for use by architecturally visible data and instructions, and by reserving a portion of the existing virtual memory for use by microarchitectural mechanisms. By utilizing the present invention, an architecture provides to its own supporting microarchitecture a special form of access to a resource (and its accompanying controls) originally intended to be provided only via the architecture to programming. The microarchitecture uses such access in lieu of providing its own resources, hence achieving advantages in one or more of the following ways: by reusing existing mechanisms and controls to meet its goals instead of incorporating different mechanisms; by achieving an increase in range or scope of said mechanisms; and by providing new microarchitectural mechanisms that may not have been economically viable if implemented in circuitry within the processor.

Just as the Von Neumann machine achieved a key benefit by extending the use of memory from data values alone, to data values and instruction codes; and as virtual memory further extended it by adding page table mapping controls, the present invention further extends the use of memory to data values, instruction codes, page table mappings, and microarchitectural behavioral information.

Figure 10:
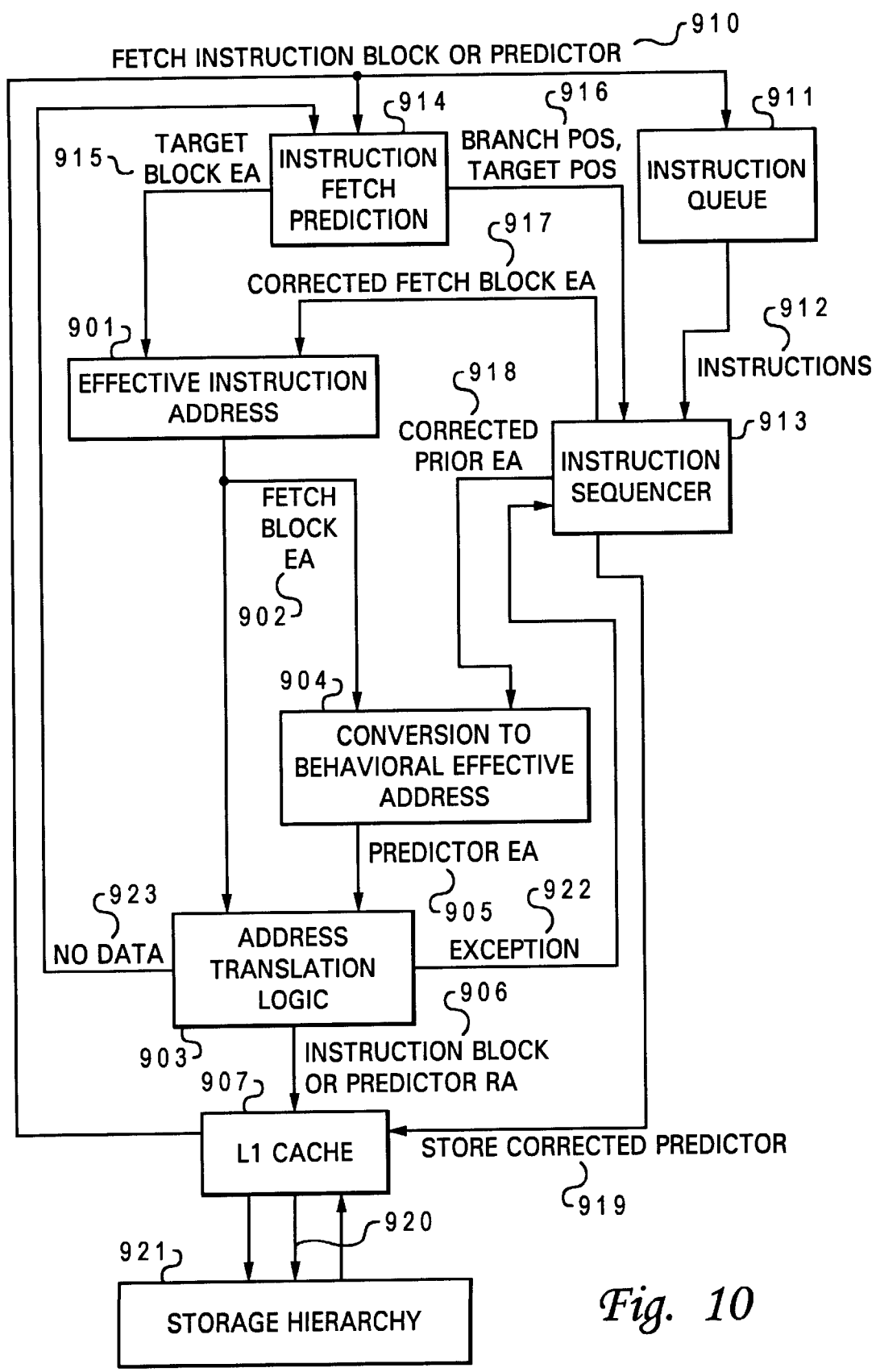
FIG. 10 is a block diagram of an instruction fetching mechanism, in accordance with a preferred embodiment of the present invention.

The present invention may be implemented in a data processing system having a processor. Referring now to FIG. 10, there is illustrated a block diagram of microarchitectural components for an instruction fetching mechanism, in accordance with a preferred embodiment of the present invention. In FIG. 10, only those components directly related to instruction fetching are shown. Instruction fetching commences when an effective instruction address register 901 sends an effective address 902 for a block of instructions to an address translation logic 903 and an address conversion logic 904 that converts an AEA to a BEA for a fetch predictor (as described in FIG. 7b). A behavioral fetch predictor effective address 905 is also sent to address translation logic 903.

Address translation logic 903, utilizing the techniques illustrated in FIG. 8 and FIG. 9, translates effective addresses to real addresses. The translation process may utilize one or more ERATs or TLBs, and these may perform any combination of sharing or segregating with respect to instruction address translation, data address translation, and behavioral address translation. From address translation logic 903, real addresses 906 are sent to those components that enable real memory, e.g., various levels of caching, main store. In the case of an exception, an exception indication 922 is sent to an instruction sequencer 913. In the case of an exception caused by a behavioral address, as well as the case in which a program running in real address mode causes a behavioral request, a zeroed data value 923 is returned to instruction fetch prediction logic 914.

For illustrative purposes, only one level of cache, a first level (L1) cache 907 is shown separately. L1 cache 907 is a memory cache that keeps the most recently accessed pieces of real memory as close to the processing unit as possible. Though one block is shown in FIG. 10, that block may include one or more caches which comprise any combination of sharing or segregating with respect to instructions, data values, and behavioral information. A cache employed for behavioral memory enabled fetch prediction must include controls for writing corrected predictors to the cache and back to the storage hierarchy. Therefore, a typical instruction cache, which supports read-only functionality, is not sufficient for caching such behavioral memory.

L1 cache 907 interacts with other execution entities not shown in this diagram, which carry out the architectural intent of the instructions. These entities also interact with sequencer 913. Requests that miss L1 cache 907 are routed to a storage hierarchy 921. Storage hierarchy 921 is an aggregation of all microarchitectural mechanisms in the system that represent memory, except for L1 caches 907, which are described separately. Information fetched from storage hierarchy 921 is routed back to L1 cache 907. Any information written to L1 cache 907 that supports write controls must be returned to storage hierarchy 921. This occurs immediately in the case of a store-through cache, or via a castout operation at the time the information is replaced or requested by another entity in the system, in the case of a store-in cache. Data is routed back to storage hierarchy 921 via a write path 920. Write request information is routed as well.

Information that is fetched from L1 cache 907 due to a cache hit, or which is routed back to L1 cache 907 after a cache miss is sent back to the processing unit via a return path 910. Instruction blocks are routed to an instruction queue 911. Fetch predictors are routed to an instruction fetch prediction mechanism 914. Fetch prediction mechanism 914 operates according to the principles described in FIG. 7a, producing a new instruction fetch address 915 and routing it to effective instruction address register 901, beginning the instruction fetch cycle anew. Fetch prediction mechanism 914 also produces branch position and target position information 916 that is routed to instruction sequencer 913 to indicate which instructions in a given fetch block should be executed.

Meanwhile, instructions from blocks 910 that were sent to instruction queue 911 are eventually routed 912 to instruction sequencer 913. Sequencer uses information 916 from fetch prediction mechanism 914 to determine which of the fetched instructions should be scheduled for execution. Sequencer 913 interacts with other execution entities not shown in this diagram, which carry out the architectural intent of the instructions. These entities also interact with L1 cache 907.

Sequencer 913 also manages the redirection of program control flow do to storage exceptions 922, other exceptions, and program control flow mispredictions. Such redirection is accomplished by computing the correct instruction fetch address 917 and sending it to effective instruction address register 901, and by discarding intervening mispredicted instructions.

In the case of such redirection, sequencer 913 often constructs (according to the data format described in FIG. 7*a*) new predictors to store into behavioral memory. To alter a current-to-next instruction block address predictor, the effective address of the mispredicted branch 918 is routed to the behavioral address computation logic 904 as a write request. The resulting behavioral effective address 905 is routed to address translation logic 903, which converts it to a real address 906 that is sent to L1 cache 907. The predictor record itself is routed via the store path 919 to L1 cache 907.

An instruction fetching mechanism such as the one described here benefits from the use of behavioral memory to provide the equivalent of a non-aliasing branch target address cache capable of retaining a unique predictor for every instruction fetch block in the system's virtual memory. Utilizing existing caches and address translation logic, the predictor operates in step with the instruction fetcher, producing a predictor for the next instruction address each time a current instruction address is used to fetch instructions.

While the invention has been particularly shown and described with reference to a preferred embodiment, it will be understood by those skilled in the art that various changes in form and detail may be made therein without departing from the spirit and scope of the invention.

What is claimed is:

1. A memory system, comprising:
a real memory having a plurality of real address locations, wherein each of said real address locations is associated with a corresponding one of a plurality of virtual address locations, wherein said virtual address locations are divided into an architecturally visible virtual memory region and a behavioral virtual memory region;
means for generating an architecturally visible memory address associated with said architecturally visible virtual memory address, wherein said architecturally visible memory address is formed by concatenating contents of a segment register indexed by a group of most significant bits of an effective address and the remaining bits of said effective address;
means for generating a behavioral virtual memory address associated with said behavioral virtual memory region, wherein said behavioral virtual memory address is formed by concatenating a bit having a predetermined logical value with a multi-bit value generated by a behavioral address generator; and an address translator for translating said architecturally visible virtual memo address and said behavioral virtual memory address to corresponding real addresses associated with said real memory.

2. The memory system of claim 1, wherein said architecturally visible virtual memory region and said behavioral virtual memory region are non-overlapping.

3. The memory system of claim 1, wherein said architecturally visible virtual memory region is accessed by an architecturally visible effective address generated by an application program.

4. The memory system of claim 3, wherein said architecturally visible virtual memory region is accessed by said architecturally visible virtual address having a logical "0" most significant bit, and said behavioral virtual memory region is accessed by said behavioral virtual address having a logical "1" most significant bit.

5. The memory system of claim 3, wherein said architecturally visible virtual memory region is accessed by said architecturally visible virtual address having a logical "1" most significant bit, and said behavioral virtual memory region is accessed by said behavioral virtual address having a logical "0" most significant bit.

6. The memory system of claim 4, wherein said address translator further includes means for testing whether or not the most significant bit of a request generated by an architectural operation is a logical "0," and said memory system generates an architectural visibility exception if the most significant bit of said request generated by an architectural operation is not a logical "0."

7. The memory system of claim 5, wherein said address translator further includes means for testing whether or not the most significant bit of a request generated by an architectural operation is a logical "1," and said memory system generates an architectural visibility exception if the most significant bit of said request generated by an architectural operation is not a logical "1."

8. The memory system of claim 6, wherein said architectural operation is a fetch instruction, a load instruction or a store instruction.

9. The memory system of claim 7, wherein said architectural operation is a fetch instruction, a load instruction or a store instruction.

10. A data processing system, comprising:
a processor; and
a memory system coupled to said processor, wherein said memory system includes
a real memory having a plurality of real address locations, wherein each of said real address locations is associated with a corresponding one of a plurality of virtual address locations, wherein said virtual address locations are divided into an architecturally visible virtual memory region and a behavioral virtual memory region;
means for generating an architecturally visible memory address associated with said architecturally visible virtual memory region, wherein said architecturally visible memory address is formed by concatenating contents of a segment register indexed by a group of most significant bits of an effective address and the remaining bits of said effective address;
means for generating a behavioral virtual memory address associated with said behavioral virtual memory regions, wherein said behavioral virtual memory address is formed by concatenating a bit having a predetermined logical value with a multi-bit value generated by a behavioral address generator; and an address translator for translating said architecturally visible virtual memory address and said behavioral virtual memory address to corresponding real addresses associated with said real memory.

11. The data processing system of claim 10, wherein said architecturally visible virtual memory region and said behavioral virtual memory region are non-overlapping.

12. The data processing system of claim 10, wherein said architecturally visible virtual memory region is accessed by an architecturally visible effective address generated by an application program.

13. The data processing system of claim 11, wherein said architecturally visible virtual memory region is accessed by said architecturally visible virtual address having a logical "0" most significant bit, and said behavioral virtual memory region is accessed by said behavioral virtual address having a logical "1" most significant bit.

14. The data processing system of claim 11, wherein said architecturally visible virtual memory region is accessed by said architecturally visible virtual address having a logical "1" most significant bit, and said behavioral virtual memory region is accessed by said behavioral virtual address having a logical "0" most significant bit.

15. The data processing system of claim 13, wherein said address translator further includes means for testing whether or not the most significant bit of a request generated by an architectural operation is a logical "1," and said memory system generates an architectural visibility exception if the most significant bit of said request generated by an architectural operation is not a logical "1."

16. The data processing system of claim 10, wherein said address translator further includes means for testing whether or not the most significant bit of a request generated by an architectural operation is a logical "1," and said memory system generates an architectural visibility exception if the most significant bit of said request generated by an architectural operation is not a logical "1."

17. The data processing system of claim 15, wherein said architectural operation is a fetch instruction, a load instruction or a store instruction.

18. The data processing system of claim 16, wherein said architectural operation is a fetch instruction, a load instruction or a store instruction.

* * * * *